United States Patent
Shinoda et al.

[11] Patent Number: 5,376,480
[45] Date of Patent: Dec. 27, 1994

[54] ALKALINE BATTERY

[75] Inventors: Kenichi Shinoda, Toyohashi; Akihide Izumi, Kosai; Mitsuo Murakoshi, Sizuoka; Kiyohide Tsutsui, Kosai; Katsuhiro Yamashita, Toyohashi; Hidenori Tsuzuki, Gamogouri; Takashi Matsuo, Kosai, all of Japan

[73] Assignee: Fuji Electrochemical Co., Ltd., Tokyo, Japan

[21] Appl. No.: 152,142

[22] Filed: Nov. 16, 1993

Related U.S. Application Data

[62] Division of Ser. No. 896,869, Jun. 11, 1992, Pat. No. 5,348,816.

Foreign Application Priority Data

Jun. 11, 1991 [JP] Japan .................... 3-165178
Oct. 31, 1991 [JP] Japan .................... 3-311432

[51] Int. Cl.⁵ ............... H01M 10/26; H01M 2/08
[52] U.S. Cl. ................... 429/206; 429/229; 429/176; 429/185
[58] Field of Search ............ 429/206, 207, 229, 185, 429/176

[56] References Cited

U.S. PATENT DOCUMENTS

| | | |
|---|---|---|
| 4,084,047 | 4/1978 | Himy et al. |
| 4,292,383 | 9/1981 | Di Palma et al. .......... 429/229 X |
| 4,500,614 | 2/1985 | Nagamine et al. .......... 429/206 |
| 5,168,018 | 12/1992 | Yoshizawa et al. .......... 429/206 X |

FOREIGN PATENT DOCUMENTS

| | | |
|---|---|---|
| 48-77332 | 10/1973 | Japan . |
| 48-87342 | 11/1973 | Japan . |
| 60-177553 | 9/1985 | Japan . |
| 60-236456 | 11/1985 | Japan . |
| 64-59768 | 3/1989 | Japan . |
| 64-59769 | 3/1989 | Japan . |
| 1-105466 | 4/1989 | Japan . |
| 4-10708 | 2/1992 | Japan . |

*Primary Examiner*—John S. Maples
*Attorney, Agent, or Firm*—Wenderoth, Lind & Ponack

[57] ABSTRACT

A gel form negative electrode of an alkaline battery is produced without mercury and enables uniform dispersion of zinc or zinc alloy powder and an effective metal which can be one or more of an oxide or hydroxide of indium, lead, gallium, bismuth. The zinc or zinc alloy powder and the effective metal are drymixed in advance of mixing with a gel form alkaline electrolyte. In order to obtain satisfactorily high vibration strength and impact resistance, fiber material can be added to the gel form negative electrode. The fiber material may be selected among rayon, vinylon, acryl, vinyon, polyamide, polypropylene, polyethylene, mercerized pulp, linter pulp.

7 Claims, 4 Drawing Sheets

ALKALINE BATTERY

This is a divisional application of Ser. No. 07/896,969, filed Jun. 11, 1992, now U.S. Pat. No. 5,348,816.

BACKGROUND OF THE INVENTION

1. Field of the Invention

The present invention relates to an alkaline battery that does not include mercury, i.e. is devoid thereof. More specifically, the invention relates to an alkaline battery with improved mixing and dispersion of zinc powder and an effective metal in an alkaline electrolyte, whereby such battery has high vibration strength and impact resistance, and whereby it is possible to eliminate degradation of ability of the battery to discharge under heavy load and low temperature.

2. Description of the Related Art

In the conventional alkaline battery, a small amount of mercury is used for forming an amalgam for increasing corrosion resistance by elevating hydrogen overvoltage of zinc used as a primary active material for a negative electrode or cathode, and for restricting passivation of zinc by converting the same into zinc oxide.

However, since mercury is a harmful substance, there have been progressive attempts to avoid use of mercury in recent years. Among various technologies for avoiding mercury, the most advanced technology in the prior art is to add a small amount of an effective metal other than mercury, such as lead, aluminum, indium, gallium, bismuth or the like to zinc for alloying. Various studies have been made with respect to the influence and so forth of the types of materials to be added or to the amount to be added for the performance of the battery, by varying compositions with employing a variety of effective metals.

Separately from the method of alloying of zinc, there is has been another attempt for adhering an effective metal, such as lead, aluminum, indium, gallium, bismuth or the like, to zinc or zinc alloy powder. The method of adhering the effective metal to the zinc or zinc alloy has been proposed in Japanese Patent Laid-open (Kokai) Nos. 60-1775 and 60-236456. In the method proposed in such publications, the effective metal and zinc powder or zinc alloy powder are reacted for substitution in an acid solution. On the other Japanese Patent Laid-open No. 1-105466 discloses a method for adhering the effective metal by directly putting an oxide or hydroxide of the effective metal in a gel form alkaline electrolyte.

However, in case of the method by reaction for substitution, since the zinc or the zinc alloy powder put in the acid solution, in which the effective metal is previously dissolved, and then mixed therewith by stirring, there is required a substantial stirring period in order to uniformly adhere the effective metal on the surface of zinc or zinc alloy powder. Furthermore, a drying process is required after the stirring and mixing process, such that the overall process becomes complicated.

On the other hand, in case of the method by directly putting the effective metal into the gel form electrolyte and then stirring for mixing, such method also requires a substantial period for uniformly distributing the effective metal relative to zinc or zinc alloy. Furthermore, by continuing stirring for a long period of time, the hydrogel structure can be destroyed to cause a lowering of viscosity resulting in secondary agglomeration or precipitation of the powder.

As is well known, gel form negative electrodes are employed as the negative electrodes for the conventional alkaline batteries. The gel form negative electrode is typically formed by mixing and kneading zinc powder, alkaline electrolyte and a gelling agent. The gelling agent is added for maintaining the zinc powder in a uniformly distributed gel form or state, for increasing the contact surface area of the zinc powder and for improving reaction efficiency.

As the gelling agent, powder form gelling agent and granular gelling agent which can hold the electrolyte are typically used. The powder form gelling agent is typically carboxymethyl cellulose (CMC), poly acrylate or salts thereof. On the other hand, the granular gelling agent is typically cross-linking and branching type poly (meta) acrylate or salts thereof as to use solely or with the gelling agent containing the same as a primary component.

However, in case of the gel form negative electrode using the powder state gelling agent, the gel form electrolyte forming the gel form negative electrode can be caused to flow in response to a strong impact, such as that applied by the battery being dropped, the result being that uniformity of distribution of zinc powder is destroyed, causing local concentration of the zinc powder. This degrades contact between the zinc powder particles or between the zinc powder and the negative collector and thus results in lowering of performance of the battery. In the prior art, a small amount of mercury has been used for avoiding such problem. However, from the ecological viewpoint, it is highly desirable to avoid use of mercury.

On the other hand, in the case of the granular gelling agent, such granular gelling agent swells by absorbing electrolyte and fills gaps between the zinc powder particles to restrict movement of the zinc powder particles upon exertion of vibration or impact. This is effective for preventing lowering the battery performance due to lowering of uniformity of zinc distribution. On the other hand, even when discharging of the battery is processed, the electrolyte absorbed in the granular gelling agent tends to be held therein. This creates a problem in that degradation of heavy load discharge performance and low temperature discharge performance cannot be satisfactorily eliminated.

In order to solve the problems set forth above, various attempts, such as use of powder state gelling agent and the granular gelling agent in combination or so forth, have been made. However, no such attempt has successfully achieved a satisfactory improvement.

SUMMARY OF THE INVENTION

It is an object of the present invention to provide an alkaline battery achieved by uniform mixing and distribution of a zinc or zinc alloy powder and an effective metal in a short period of time.

In order to accomplish the above-mentioned object, there is provided a negative electrode formed by dry mixing one or more selected among an oxide or hydroxide of indium, lead, gallium, bismuth, with zinc or zinc alloy powder to form a dry mixture, putting the dry mixture thus formed into a gelatinized alkaline electrolyte, and stirring and dispersing the mixture in the gelatinized alkaline electrolyte.

In the alternative, a negative electrode may be formed by dry mixing one or more of an oxide or hydroxide of the above-mentioned metals, zinc or zinc alloy powder, and powder state gelling agent to form a mixture, putting the mixture into an electrolyte, and then mixing and dispersing the mixture in the electrolyte.

In the case wherein the effective metal and zinc or zinc alloy powder are directly mixed in the dry condition, the drying process required by the conventional process employing a substitution reaction can be eliminated. In addition, when the effective metal and the zinc or zinc alloy powder is put in the alkaline electrolyte in the mixed condition, the stirring period required for obtaining uniform mixing and distribution can be significantly shortened. Furthermore, by mixing the powder state gelling agent in addition, gelation of the electrolyte progresses simultaneously with dispersion of the zinc or zinc alloy and the effective metal.

By such production of the negative electrode of the alkaline battery according to the present invention, the production process can be simplified of comparison with that in the conventional process. Therefore, production efficiency can be significantly improved. Also, when the mixture is mixed with the gelatinized alkaline electrolyte after dry mixing, the stirring period required for achieving uniformly dispersed mixing can be shortened to approximately 10 minutes. This apparently contributes to improving production efficiency. Furthermore, the problem at breakage of the gel structure will never be caused. Accordingly, the alkaline battery thus obtained is highly leak-proof. Therefore, the negative electrode is suitable for avoiding use of mercury and for uniformly adhering the effective metal on the zinc or zinc alloy powder in the alkaline battery.

Another object of the present invention is to provide an alkaline battery incorporating the negative electrode produced as discussed above to be devoid of mercury and which has high vibration strength and impact resistance, and which can maintain performance even under heavy load and low temperature conditions.

In order to accomplish the above-mentioned object, a fiber material is added to the gel form negative electrode of the alkaline battery, which gelatinized negative electrode contains alkaline electrolyte, gelling agent and zinc powder.

The preferred fiber material is an alkali-proof fiber, such as rayon, vinylon, acryl, vinyon, polyamide, polypropylene, polyethylene, mercerized pulp, inter pulp or so forth.

According to the present invention, since the fiber material is added to the gel form negative electrode containing the electrolyte, the gelling agent and the zinc or zinc alloy powder, the zinc or zinc alloy powder particles are caused to aggregate three dimensionally in the fiber material and are maintained with restricted motion.

Also, since the fiber material swells by absorbing the electrolyte and increases tightness of contact between the zinc or zinc alloy powder and a negative pole collector, an increase of internal resistance can be eliminated.

In addition, the electrolyte absorbed in the fiber material can flow out by a given amount according to progress of discharging such that discharge characteristics can be stabilized.

When alkali-proof fiber, such as rayon, vinylon, acryl, vinyon, polyamide, polypropylene, polyethylene, mercerized pulp, linter pulp or so forth, is employed, the fiber will maintain its characteristics for a long period of time, thereby stably providing the foregoing effect for long period of time.

With the alkaline battery according to the present invention, since the fiber material is added for the gel form negative electrode containing alkaline electrolyte, gelling agent and zinc or zinc alloy powder, the zinc or zinc alloy powder may be caught within the three dimensional aggregation and maintained therein, a vibration or impact exerted on the battery can be absorbed by the fiber, and motion of the zinc or zinc alloy powder particles can be restricted. This provides improvement in of vibration strength and impact resistance of the negative electrode for of the alkaline battery.

Other objects and advantages of the present invention will become clear from the further detailed description given herebelow in terms of preferred embodiments of the present invention.

BRIEF DESCRIPTION OF THE DRAWINGS

The present invention will be understood more fully from the detailed description given herebelow and from the accompanying drawings illustrating preferred embodiments of the invention, which, however, should not be taken to be limitative to the invention, but are for explanation and understanding only.

In the drawings.

DESCRIPTION OF THE PREFERRED EMBODIMENTS

Figure 1:
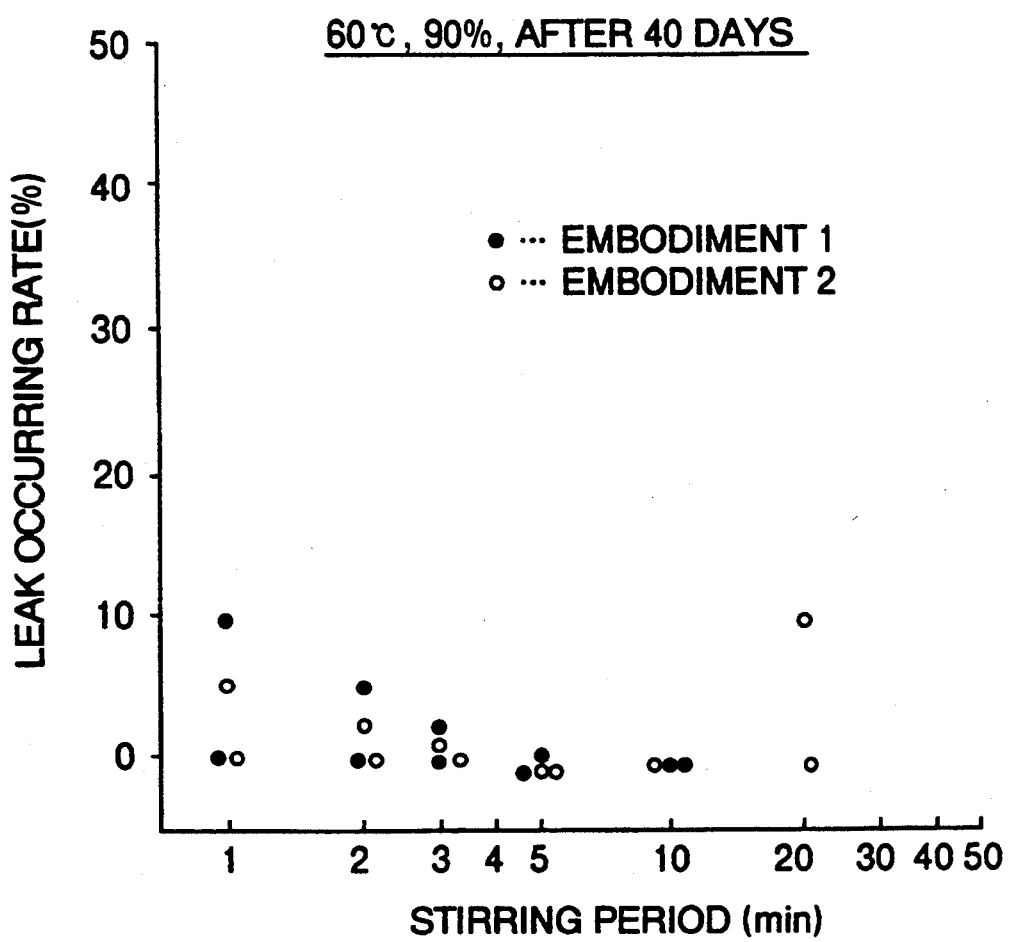
FIG. 1 is a graph showing the relationship between stirring and mixing period and leakage rate with respect to gel form alkaline electrolyte in examples 1 and 2 of the present invention.

Preferred embodiments of the present invention with comparative examples will be discussed herebelow. The composition ratio of basic materials forming a gel form negative electrode is the same for all of the embodiments and the comparative examples. It should be noted that though the following discussion will be given in terms of a gel form negative electrode with typical composition as shown in the following table, the present invention is equally applicable for any other compositions of negative electrodes for an alkaline battery.

Also, in the shown embodiments and the comparative examples, pure indium is selected as a material of the effective metal to be added, and is known as being of relatively high effect in a non-mercury battery. However, various metallic materials to form the effective metal are obvious to those skilled in the art. For instance, an oxide or hydroxide of lead, gallium, bismuth can be employed solely or in combination as suitable materials for forming the effective metal to be added.

EXAMPLE 1

TABLE 1

| Blended Material and Composition Ratio for Gel Form Negative Electrode | |
|---|---|
| (1) Gelling Agent (Polyacrylic Acid) | 4.5 Wt parts |
| (2) 40 Wt % Potassium Hydroxide Electrolyte (saturated ZnO) | 250 Wt parts |

TABLE 1-continued

Blended Material and Composition Ratio
for Gel Form Negative Electrode

| | |
|---|---|
| (3) Zinc Alloy Powder (Zn - 500 ppm Pb) | 430 Wt parts |
| (4) Indium Oxide ($In_2O_3$) | 0.1 Wt parts |
| Total | 684.6 Wt parts |

It should be noted that, when indium hydroxide is selected in place of the indium oxide, converting with the equivalent of indium, 0.12 parts by weight of indium hydroxide will be added for 430 parts by weight of zinc alloy powder. On the other hand, an average grain size of the zinc alloy powder was approximately 150 μm, an average grain size of indium oxide was approximately 5 μm, and the average grain size of the gelling agent in a form of a dry powder was 10 μm.

PRODUCTION OF GEL FORM NEGATIVE ELECTRODE

Among the components listed above, polyacrylic acid (1) and potassium hydroxide electrolyte (2) were preliminarily mixed to prepare the gel form alkaline electrolyte. Also, the zinc alloy powder (3) and indium oxide (4) were mixed by dry mixing to form a dry mixture. Mixing was performed by using a ribbon blender while preventing variation of grain size. A stirring and mixing period was approximately 60 seconds. Next, the dry mixture of the zinc alloy powder (3) and the indium oxide (4) was put in the gel form alkaline electrolyte. Then, stirring and mixing were performed to complete the gel form negative electrode. The gel form negative electrode applicable for various types of batteries, such as a cylindrical battery, a button type battery or so forth. It should be noted that, since the zinc alloy powder and the indium oxide are mixed in the dry condition, the mixture will not be affected even when it is left for a long period of time. Therefore, the order of processing need not necessarily be to first prepare the alkaline electrolyte and then mix the zinc alloy powder (3) and indium oxide (4).

EXAMPLE 2

Among the components of the above-mentioned example 1, polyacrylic acid (1), the zinc alloy powder (3) and indium oxide (4) were dry mixed to form a dry mixture. For mixing, a ribbon blender was used. Stirring and mixing were performed for approximately 60 seconds. Then, the dry mixture of polyacrylic acid (1), the zinc alloy powder (3) and indium oxide (4) was put in a preliminarily prepared alkaline electrolyte. Then, stirring and mixing were performed to complete the gel form negative electrode. This gel form electrode is applicable for various types of batteries, such as a cylindrical battery, a button type battery or so forth.

LEAK-PROOF ABILITY TEST FOR EXAMPLES 1 AND 2

By varying the stirring period for stirring and mixing in the electrolyte from 1 min. to 20 min. samples of gel form negative electrodes were prepared. The samples were filled in LR6 type cylindrical alkaline batteries. The batteries thus produced were left in an atmosphere of 90% of relative humidity and 60° C. of temperature. After 40 days, a leakage occurring rate, i.e. rate of occurrence of leaks, was checked. The results of such test are shown in FIG. 1. In FIG. 1, the white dots show the leakage occurring rate of example 1, and the black dots show the leakage occurring rate of example 2. The number of respective samples was 100, and there were two lots. Variation between respective lots was also inspected.

As is clear from the leakage occurring rates shown in FIG. 1, a certain extent of variation between lots, exists the leakage occurring rate for the samples for which the stirring period was 1 to 2 min. was 0 to 10%. When the stirring period was extended to be 5 to 10 min., the leakage occurring rate was further reduced and became substantially zero at a stirring period of 10 min. In this last case, no variation between lots could be observed.

It should be noted that when stirring was performed for 20 min. the leakage occurring rate was increased. is considered that increasing of the leakage occurring rate was caused by the gel structure being destroyed by stirring for a long period of time to cause lowering of viscosity of the gel form negative electrode to cause secondary agglomeration or so forth. Accordingly, the preferred stirring and mixing period is approximately 10 min.

As set forth above, the results shown in FIG. 1 illustrate the fact that, by preliminarily performing dry mixing, the indium oxide uniformly adheres on each particle of the zinc alloy powder, and the desired performance can be obtained by a short period of stirring only for dispersion in the alkaline electrolyte.

COMPARATIVE EXAMPLE 1

In the composition shown in the example 1, the amounts of the polyacrylic acid (1) and potassium hydroxide electrolyte (2) were set equal to each other. These two components were preliminarily mixed to form a gel form alkaline electrolyte. On the other hand, as indium, $InCl_3$ having an equivalent of indium equal to that in the foregoing examples was used. $InCl_3$ was dissolved in pure water to obtain an acid solution. To this acid solution were added the zinc alloy powder in the same amount as the foregoing examples. After stirring for a period of time, varied between 2 min. to 30 min., the water was evaporated in a vacuum dryer at a temperature of 60° C. for drying of the powder. The dry powder thus obtained was put in the above-mentioned gel form electrolyte, and stirred and mixed for 10 min. to complete the gel form negative electrode.

LEAK-PROOF ABILITY TEST FOR COMPARATIVE EXAMPLE 1

Figure 2:
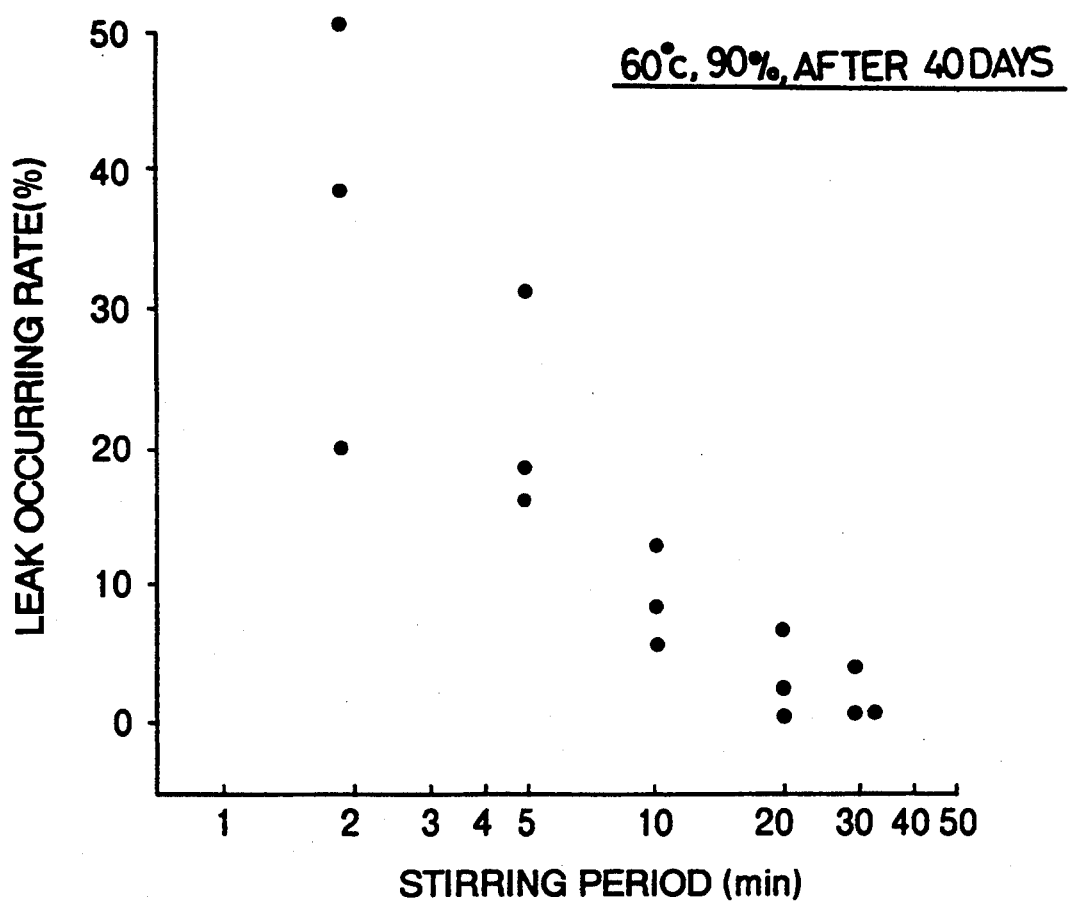
FIG. 2 is a graph showing the relationship between stirring and mixing period and leakage rate in a case wherein zinc alloy powder is dissolved in an $InCl_3$ solution in a comparative example 1.

In comparative example 1, samples of the gel form negative electrode were prepared by employing zinc alloy powder on which indium was adhered by varying the period of stirring in the acid solution, in which $InCl_3$ is already dissolved, from 2 min. to 30 min. The samples of the gel form negative electrode were filled in LR6 type alkaline batteries. The batteries thus produced were left under in an atmosphere of 90% of relative humidity and 60° C. temperature. After 40 days, leakage occurring rates were checked. The results of such tests are shown in FIG. 2. The number of respective samples was 100, and there were three lots. Variation between respective lots was also inspected.

As is clear from the leakage occurring rates shown in FIG. 2, the leakage occurring rates for the samples, for which the stirring period was 2 min., was 20 to 50% and thus unacceptably high. Also at a 2 min. stirring period, substantial fluctuation between lots was observed. By expanding the stirring period, the leakage occurring rate was decreased accordingly, and the minimum rate was reached at a stirring period of 30 min. However, a requirement for a 30 min. stirring period for each lot in order to adhere indium to the zinc alloy powder is unacceptable for industrial application from the point of view of production efficiency.

COMPARATIVE EXAMPLE 2

In the composition of example 1 polyacrylic acid (1) and potassium hydroxide electrolyte (2) were mixed to preliminarily form the gel form alkaline electrolyte. The zinc alloy powder (3) and indium oxide (4) in the same amounts as the foregoing example 1 were simultaneously put in the prepared gel form alkaline electrolyte. Then, by stirring and mixing, the gel form negative electrode was completed.

LEAK-PROOF ABILITY TEST FOR COMPARATIVE EXAMPLE 2

Figure 3:
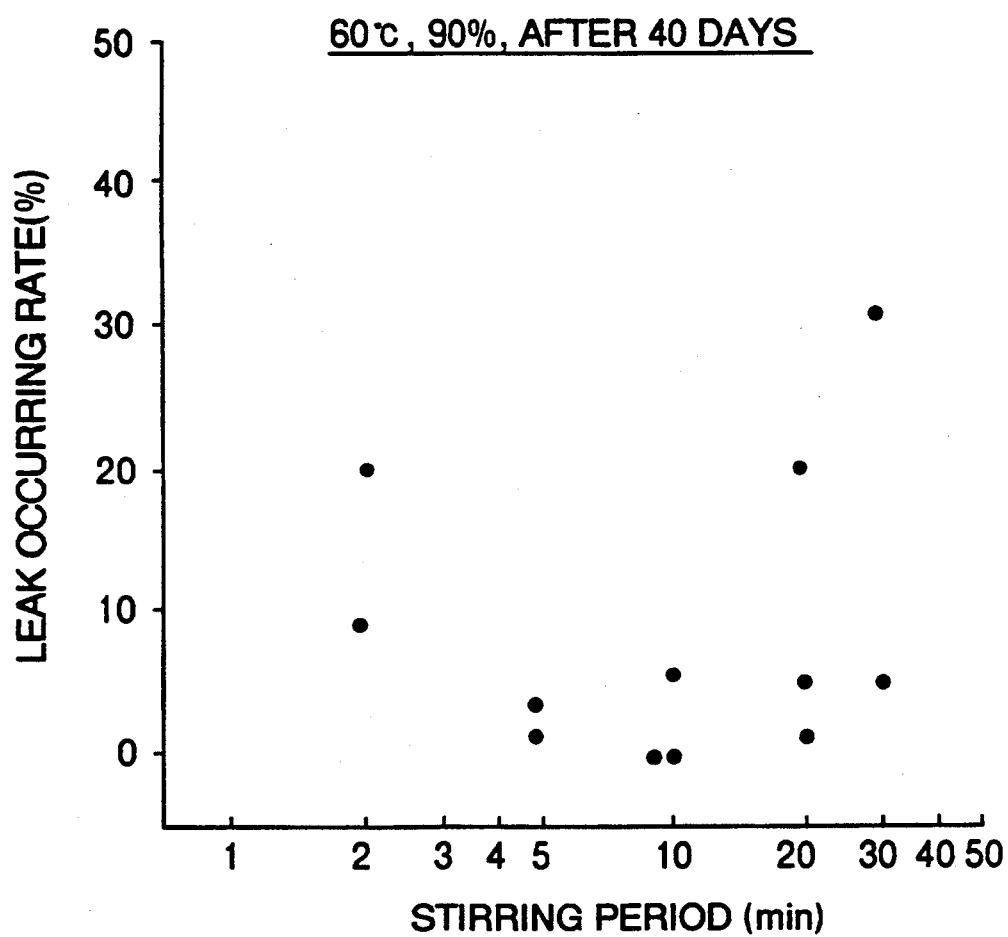
FIG. 3 is a graph showing the relationship between stirring and mixing period and leakage rate with respect to gel form alkaline electrolyte in a comparative example 2.

In comparative example 1, samples of the gel form negative electrode were prepared by varying the stirring period in the electrolyte from 2 min. to 30 min. The samples of the gel form negative electrode were filled into LR6 type alkaline batteries. The batteries thus produced were left in an atmosphere of 90% of relative humidity and 60° C. temperature. After 40 days, leakage occurring rates were checked. The results of such tests are shown in FIG. 3. The number of respective samples was 100, and there were two or three lots. Variation between respective lots was also inspected.

As is clear from the leakage occurring rates shown in FIG. 3, the leakage occurring rates for the samples for which the stirring period was 2 min. was 20 to 50% and thus unacceptably high. Also at a 2 min. stirring period, substantial fluctuation between lots was observed. When the stirring period was in a range of 5 to 10 min. the leakage occurring rate was decreased accordingly, and the minimum rate, e.g. approximately 5% was reached at a stirring period at 10 min. However, when the stirring period was further extended in a range of 20 to 30 min, the leakage occurring rate was increased. Also, fluctuation between lots became greater. It is considered that increasing of the leakage occurring rate was caused in that the gel structure was destroyed by stirring for a long period of time, thus causing lowering of viscosity of the gel form negative electrode to cause secondary agglomeration or so forth. Therefore, the leak occurring rate cannot be satisfactorily lowered.

As will appreciated from the discussion hereabove, with the foregoing examples 1 and 2 the effective metal as a replacement of mercury can be uniformly adhered on each of individual zinc or zinc alloy powder particles in a short stirring period.

Figure 4:
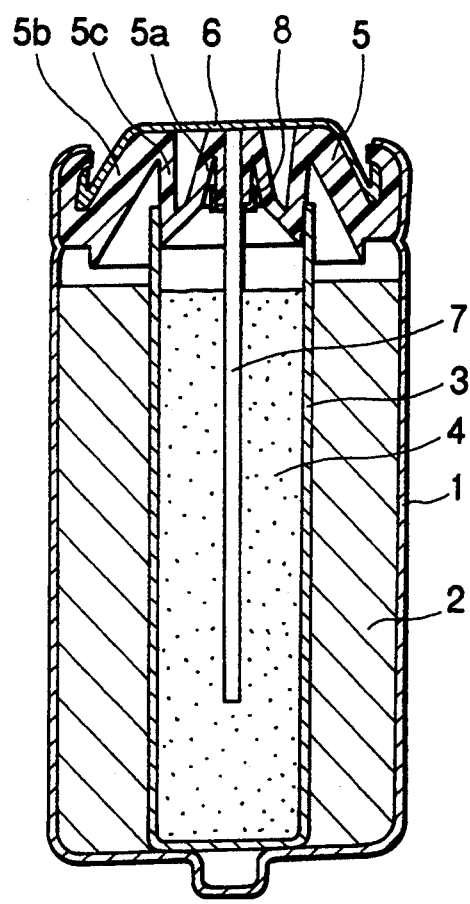
FIG. 4 is a cross section showing construction of a cylindrical alkaline battery.

FIG. 4 shows a cross section of a cylindrical alkaline battery. The shown construction of the cylindrical alkaline battery includes a cylindrical positive pole can 1. A positive pole composition 2 of manganese dioxide and graphite, a separator 3 and a gel form negative electrode 4 are arranged in the positive pole can 1 in order and in coaxial arrangement.

A negative pole terminal plate 6 is arranged in an opening of the positive pole can 1 via an electrically insulating seal gasket 5. An edge portion of the positive pole can 1 is crimped inwardly so that an outer circumference of the seal gasket 5 is clamped in a leak-proof fashion between the crimped edge of the opening of pole can 1 and an outer circumferential portion of the negative pole terminal plate 6. The seal gasket 5 includes a central boss portion 5a, an outer circumferential portion 5b and a connecting portion 5c interpositioned between the central boss portion and the outer circumferential portion.

On an inner center portion of the negative pole terminal plate is fixed by spot welding a negative pole collector 7. The negative pole collector 7 extends through a center opening defined through the central boss portion 5a of the seal gasket 5. Furthermore, for the central boss section 5a, a seal cap 8 is fitted from the inside of the battery.

When mercury is avoided for the negative electrode 4, conventionally known brass or other pure metal can be employed as the negative pole collector 7. Preferably, plating of solder, tin, indium or so forth provided on the surface of such metal collector so as to further restrict generation of hydrogen from the zinc powder or zinc alloy powder.

As the seal cap 8 for the alkaline battery, which used mercury is avoided for the gel form negative electrode 4, if a conventional seal cap which is formed by punch forming from a tin plated steel plate, the flash formed by such punching process and exposing elemental iron may promote generation of hydrogen gas to that would degrade the leak-proof capability of the battery.

Accordingly, it is preferred to form the seal cap 8 of brass for restricting the amount of hydrogen gas generated. In this case, if a degree of amalgamation relatively high, such as greater than or equal to 0.6 Wt %, dispersion of mercury may be caused along a crystal interface to lower the toughness of the seal cap, such that the seal cap easily may crack or will not maintain necessary seal strength. However, according to the present invention, use of mercury can be completely avoided, such problem never will be caused.

Furthermore, when the degree of amalgamation restricted to be lower than or equal to 1.5 Wt % or mercury is completely avoided, leak-proof ability can be improved by employing a seal cap 8 formed by a plate material which is formed by solder plating on a brass blank plate. It is considered that such effect is achieved because the layer of solder plating prevents a local cell from being formed between the zinc or zinc alloy powder and the seal cap thus eliminating generation of hydrogen.

For demonstrating performance of the brass seal cap, seal caps 8 were prepared from steel plate, brass plate and solder plated brass plate. Using these seal caps, respectively 60 LR6 type cylindrical alkaline batteries were formed with gel form electrodes having respective degrees of amalgamation of 1.5 Wt %, 0.15 Wt % and Wt %. These batteries were stored in an atmosphere of relative humidity and 60° C. temperature, for 20 to 100 days to determine the number of batteries undergoing leakage. The results are shown in the following table 2.

TABLE 2

Relationship Between Leak-Proof Ability, Material of Seal Cap and Degree of Negative Electrode Amalgamation

| Amalgamation Degree | Storing Days | | | | |
|---|---|---|---|---|---|
| (Wt %) | 20 | 40 | 60 | 80 | 100 |
| 1. Tin Plated Steel Plate Seal Cap | | | | | |
| 1.5 | 0 | 0 | 0 | 0 | 3 |
| 0.15 | 0 | 0 | 5 | 12 | 29 |
| 0 | 0 | 10 | 29 | 60 | — |
| 2. Brass Plate Seal Cap | | | | | |
| 1.5 | 0 | 7 | 10 | 25 | 30 |
| 0.15 | 0 | 0 | 0 | 0 | 5 |

TABLE 2-continued
Relationship Between Leak-Proof Ability,
Material of Seal Cap and Degree of Negative Electrode
Amalgamation

| Amalgamation Degree | Storing Days | | | | |
|---|---|---|---|---|---|
| (Wt %) | 20 | 40 | 60 | 80 | 100 |
| 0 | 0 | 0 | 0 | 1 | 10 |
| 3. Solder Plated Brass Seal Cap | | | | | |
| 1.5 | 0 | 0 | 2 | 10 | 17 |
| 0.15 | 0 | 0 | 0 | 0 | 2 |
| 0 | 0 | 0 | 0 | 0 | 2 |

Next, by experimentally producing LR6 type alkaline batteries having gel form negative electrodes 4 similar to the conventional one and batteries including gel form negative electrodes to which are variety of fibers were added, performance test were conducted. The following are particulars of respective of the batteries subject to such performance tests.

PRIOR ART 1

A gel form negative electrode was prepared by dissolving ZnO in a 40 Wt % KOH solution in a saturated condition, adding a powder state gelling agent (powder state polyacrylate), thus preparing a gel form alkaline electrolyte, and adding zinc powder 60 Wt % to 40 Wt % of gel form alkaline electrolyte.

PRIOR ART 2

A gel form negative electrode was prepared by replacing the powder state gelling agent in the above prior art example 1 with a mixture of 50 Wt % powder state polyacrylate and 50 Wt % granular polyacrylate.

SAMPLE 1

A gel form negative electrode was prepared by adding rayon fiber in an amount of 2 Wt % relative to the weight of the zinc powder in prior art example 1.

SAMPLE 2

A gel form negative electrode was prepared by adding mercerized pulp in an amount of 2 Wt % relative to the weight of zinc powder in the prior art example 1.

SAMPLE 3

A gel form negative electrode was prepared by adding vinylon fiber in an amount of 2 Wt % relative to the weight of the zinc powder in prior art example 1.

SAMPLE 4

A gel form negative electrode was prepared by adding acryl fiber in an amount of 2 Wt % relative to the weight of the zinc powder in prior art example 1.

It should be noted that in the foregoing samples 1 to 4 the fiber materials were approximately 4 mm in length and of 0.5 to 1 denier.

Using LR6 type cylindrical alkaline batteries containing the above-mentioned six types of gel form negative electrodes, (A) a vibration test and (B) a discharging performance test under heavy load and low temperature were performed.

(A) Vibration Test

By setting magnitude of vibration at 1.5 mm, and varying vibration frequencies increasing from an initial setting of 10 Hz to 55 Hz in a rate of 1 Hz/min, and then decreasing to 10 Hz in the same rate, shorting current was measured and compared with an initial value.

(B) Heavy Load and Low Temperature Discharge Performance Test

At an environmental temperature of 20° C., and at a load resistance of 2Ω, an elapsed time of continuous discharge up to a final voltage (E. P. V.) of 0.9V was measured and compared with an initial value. Also, at an environmental temperature of −10° C., and with at a load resistance of 10Ω, the discharge period up to the final voltage, i.e. 0.9V, was measured. It should be noted that the tests were performed after storing the sample batteries for 20 days at 60° C. (accelerating conditions substantially corresponding to 1 year storage at normal temperature).

The following tables 3 and 4 shows the results of the tests. Such results of the test (A) are shown as percentage of magnitude of shorting current with respect to initial shorting current. The results of the test (B) are shown as percentage of the discharge period to reach the final voltage after storing with respect to the initial discharging period.

TABLE 3

| Vibration Test (%) Sample Battery | | | | | |
|---|---|---|---|---|---|
| Sample 1 | Sample 2 | Sample 3 | Sample 4 | Prior Art 1 | Prior Art 2 |
| 87 | 86 | 94 | 82 | 75 | 88 |

TABLE 4

| Heavy Load and Low Temperature Discharge Performance Test (%) Sample Battery | | | | | |
|---|---|---|---|---|---|
| Sample 1 | Sample 2 | Sample 3 | Sample 4 | Prior Art 1 | Prior Art 2 |
| 1. Heavy Load Performance Test (2Ω Continuous Discharge, EPV = 0.9 V, 20° C.) | | | | | |
| 93 | 89 | 88 | 96 | 82 | 85 |
| 2. Heavy Load and Low Temperature Performance Test (1Ω Continuous Discharge, EPV = 0.9 V, −10° C.) | | | | | |
| 95 | 96 | 93 | 98 | 89 | 92 |

(A) Results of Vibration Test

All of the samples 1 to 4 exhibit better results than that of the prior art example 1, in which only powder state gelling agent was used. Sample 3, in which vinylon fiber was added, obtained better results than prior art example 2, in which the powder state gelling agent and granular gelling agent were used in combination. From this, it should be understood that addition of soft fiber material having high impact absorbing ability is particularly effective in terms of vibration strength and impact resistance.

On the other hand, in addition to this test, a discharge test was performed by connecting LR20 type alkaline batteries to 1Ω of load resistance. The batteries were dropped five times onto an iron plate from a height of 10 cm. Then, terminal voltage at both ends of the load resistor was measured. This test was performed with respect to (a) no mercury added, (b) 250 ppm of mercury added (amalgamation degree of 1.5 Wt %, similar to those on the market) and (c) no mercury added and vinylon fiber is added. The results were compared. In such results, in case of the battery to which no mercury is added, the terminal voltage abruptly dropped upon the falling impact. After recovery, a certain magnitude of offset relative to the initial voltage was maintained. In contrast, in case of the battery to which 2.0 Wt % of vinylon fiber was added, only a slight variation of the terminal voltage was observed upon the falling impact, and the voltage was instantly recovered to the initial value. This is substantially the equivalent performance to the presently available battery containing 250 ppm of mercury.

(B) Results of Heavy Load and Low Temperature Discharge Performance Test

With respect either to the condition of heavy load at 20° C. with a 2Ω continuous discharge and the condition of heavy load and low temperature of −10° C., with a 10Ω continuous discharge, samples 1 to 4 exhibited better performance than prior art example 1 and equivalent to performance of the prior art example 2. Particularly, the sample 4, in which the acryl fiber is added, demonstrated a remarkable improvement of performance.

As discussed in detail hereabove, by adding fiber to the gel form negative electrode of the cylindrical alkaline battery, vibration strength and impact resistance equivalent to those now available can be obtained even when mercury is avoided. Furthermore, degradation of heavy load and low temperature discharge performance after storage can be reduced to certainly maintain performance equivalent to that of conventional batteries containing mercury.

It should be noted that although the foregoing discussion has been directed to a cylindrical battery, the present invention is equally applicable for a variety of configurations or structures of alkaline batteries.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within the scope encompassed and equivalents thereof with respect to the features set forth in the appended claims.

What is claimed is:

1. An alkaline battery comprising a positive electrode and a gel form negative electrode devoid of mercury, said negative electrode containing a zinc or zinc alloy powder and a fiber material mixed with an alkaline electrolyte.

2. An alkaline battery as set forth in claim 1, wherein said fiber material is at least one fiber material selected from rayon, vinylon, acryl, vinyon, polyamide, polypropylene, polyethylene, mercerized pulp and linter pulp.

3. An alkaline battery as set forth in claim 1, which further comprises a positive container member, a negative terminal plate, a seal gasket clamped between said positive container member and said negative terminal plate, a negative collector extending through a center boss part of said seal gasket and fixed to said negative terminal plate by spot welding, and a seal cap fitted to said center boss part of said seal gasket from inner side opposite to said negative terminal plate, said negative collector and said seal cap being formed of brass.

4. An alkaline battery as set forth in claim 3, wherein said negative collector and said seal cap are formed of solder plated brass material.

5. An alkaline battery as set forth in claim 1, wherein said gel form negative electrode is formed by the steps of:
preparing by dry mixing a dry mixture of one or more of an oxide of hydroxide of indium, lead, gallium and bismuth and a zinc or zinc alloy powder;
putting said dry mixture into a gel form alkaline electrolyte; and
mixing and dispersing said dry mixture in said gel form alkaline electrolyte.

6. An alkaline battery as set forth in claim 1, wherein said gel form negative electrolyte is formed by the steps of:
preparing a gel form alkaline electrolyte by mixing a potassium hydroxide electrolyte and polyacrylic acid;
preparing by dry mixing a dry mixture of a zinc or zinc alloy powder and indium oxide;
putting said dry mixture into said gel form alkaline electrolyte; and
stirring said gel form alkaline electrolyte with said dry mixture therein and thereby mixing and dispersing said dry mixture therein.

7. An alkaline battery as set forth in claim 1, wherein said gel form negative electrolyte is formed by the steps of:
preparing by dry mixing a dry mixture of a zinc or zinc alloy powder, indium oxide and polyacrylic acid;
putting said mixture into a potassium hydroxide electrolyte; and
stirring said potassium hydroxide electrolyte with said dry mixture therein and thereby mixing and dispersing said dry mixture therein.

* * * * *